United States Patent [19]
Moore

[11] Patent Number: 6,073,944
[45] Date of Patent: Jun. 13, 2000

[54] SCHOOL SUPPLIES TRANSPORTING DEVICE

[76] Inventor: Larry James Moore, 4732 Kenilwood Ave., Huber Heights, Ohio 45424

[21] Appl. No.: 08/915,743

[22] Filed: Aug. 21, 1997

[51] Int. Cl.$^7$ .................................................. B62B 1/00
[52] U.S. Cl. .................................. 280/47.26; 280/655.1; 206/558
[58] Field of Search ................................ 280/47.26, 655, 280/655.1, 47.19, 47.315; 206/558, 565

[56] References Cited

U.S. PATENT DOCUMENTS

| | | | |
|---|---|---|---|
| 1,523,136 | 1/1925 | O'Connor | 220/533 |
| 2,572,486 | 10/1951 | Isaac | 280/47.26 |
| 2,883,731 | 4/1959 | Wells | 280/47.26 |
| 3,366,397 | 1/1968 | Zeilstra et al. | 280/47.26 |
| 5,511,682 | 4/1996 | Pace | 280/47.26 |
| 5,797,612 | 8/1998 | Buccioni | 280/47.26 |

*Primary Examiner*—J. J. Swann
*Assistant Examiner*—James S. McClellan

[57] ABSTRACT

A transporting device adapted to be manually towed behind a student. The transporting device comprises a container with attached telescoping handle and incorporating an axle with attached wheels. Within the container can be placed school books, pencils, pens, paper, and other school supplies. Vertical spacers within the container hold the books and notebooks in an upright position. When the telescoping handle is in the retracted position, the transporting device easily fits beneath a school desk.

7 Claims, 6 Drawing Sheets

SCHOOL SUPPLIES TRANSPORTING DEVICE

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates to a transporting device for easy movement of books, notebooks, pens, pencils, paper, and other school supplies normally used by a student.

Prior devices for transporting school supplies have had many disadvantages. For example, students are required to manually carry cumbersome school supplies in containers that are suspended from straps. This configuration can cause stress to back muscles. Another common difficulty is that the container cannot hold all of the supplies and the pens and pencils and other small articles often gravitate to the bottom of the container so that they are difficult to retrieve.

BRIEF SUMMARY OF THE INVENTION

This patent application covers the present invention which relates to a transporting device for use by school students that facilitates transporting books, paper, pencils, pens, and other school supplies, hereafter referred to as school supplies.

The device has a box shaped container with wheels and a telescoping handle that allow the student to manually tow the school supplies. The telescoping handle is attached to the back of the box shaped container. The lid of the container is hinged at one side so that the lid may be opened to permit the school supplies to be placed inside the container. A latch on the side opposite from the hinges keeps the lid closed to contain the school supplies until they are needed.

It is therefore an object of this invention to provide a transporting device which incorporates wheels to allow for easy movement of school supplies.

It is further the object of this invention to provide a transporting device that incorporates a telescoping handle constructed in such a manner that the school supplies can be towed behind the student utilizing the transporting device.

It is still further an object of this invention to provide a transporting device and incorporated telescoping handle that is compact enough to enable the transporting device to be stored under a school desk when not in use.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 6:
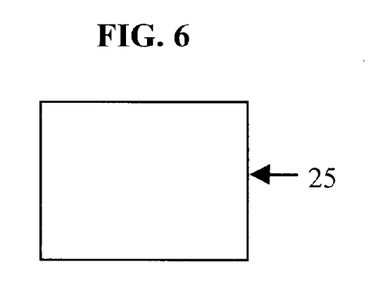
FIG. 6 is a side view of a removable spacer which is used to hold books or notebooks in an upright position.

Referring now in the drawings, the numeral 10 refers generally to the telescoping handle assembly, with the numeral 15 denoting the container's storage compartment. The container assembly comprises a closed box shaped base 16 and a lid 11 to close the top thereof. The box shaped base 16 has a front wall 12, two side walls 13, and a back wall 14 that are joined to form a peripheral wall 17. Each side wall has a cylindrical hole whose function will be disclosed hereinafter. Four attachment blocks 18, two upper and two lower, are fixed to the back wall 14. Each block 18 has a centrally located vertical hole and is cut into two equal parts along the vertical line 6—6 such that one half of each block 18 is fixed to the back wall 14 and the other half is removable to allow for attachment and removal of the telescoping handle assembly 10. The removable halves are normally attached to the fixed halves by screws. The removable halves of the two upper attachment blocks 18 having a horizontal cylindrical hole along the line 3—3 being open at one end and closed at the end joined to the fixed halves. The closed end having a centrally located aperture whose function will be disclosed hereinafter. The horizontal hole is internally threaded to incorporate a spring-loaded locking device 35. The locking device holds the telescoping handle assembly 10 in the extended position. The peripheral wall 17 is fastened at one end to the bottom 19. Two support blocks 9 are fixed to the bottom 19 and located adjacent to the side walls 13 and in alignment with the edge formed by the junction of the front wall 12 and the bottom 19. The function of the support blocks 9 is to hold the transporting device in an upright and level position when not being towed. The edge of the box shaped base formed by the junction of the bottom 19 and the back wall 14 is beveled to allow more clearance between the box shaped base and the surface upon which the transporting device is being towed. The top of the peripheral wall 17 has a groove 20 formed on the exterior surface thereof whose function will be disclosed hereinafter. A triangular shaped block 21 is disposed within the container storage compartment 15. The block 21 is fixed to the beveled edge and side walls 13 of the box shaped base. The block 21 has a cylindrical hole therein which aligns with the hole in each side wall 13 for the purpose of inserting the axle 22. Two wheels 23 are attached to the axle 22 such that one wheel is attached to each end. A support wall 53 is arranged within the container storage compartment 15 such that the sides of the support wall 53 are perpendicular to and fixed to the side walls 13 and that the bottom edge of the support wall 53 is perpendicular to and fixed to the bottom 19. The front wall 12 has vertical grooves 24 formed on the interior surface thereof which extend from the top of the front wall 12 to the top surface of the bottom 19. The support wall 53 has vertical grooves 24 formed on the interior surface thereof that extend from the top of the support wall 53 to the top surface of bottom 19. The grooves 24 are aligned such that they hold the removable spacer 25 in a vertical position and perpendicular to the front wall 12 and to the support wall 53.

Figure 7:
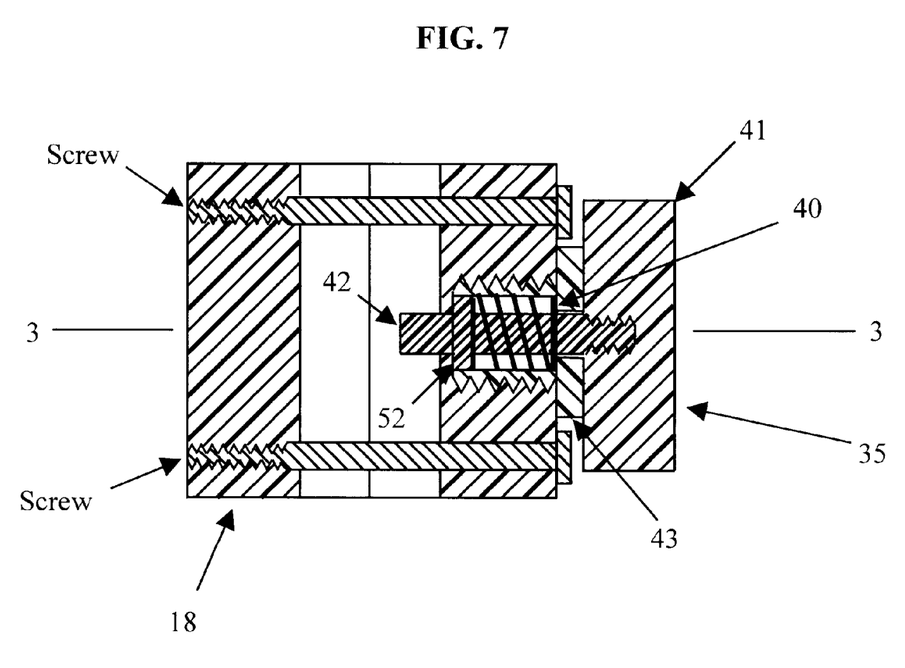
FIG. 7 is a side sectional view taken substantially along the line of 6—6 of an upper attachment block containing a spring-loaded locking device.

The two locking devices 35 comprise a spring 40 and a cylindrical knob 41 having a centrally located threaded aperture and a cylindrical pin 42 being externally threaded at one end and having a collar 52 fixed to the opposite end such that a portion of pin 42 extends beyond the collar 52 and a flanged hollow cylinder 43 having external threads and being closed at the flanged end. The closed end of cylinder 43 has a centrally located hole. The spring 40 is inserted into the hollow cylinder 43. The threaded end of pin 42 is inserted into spring 40 such that the collar on pin 42 fits into cylinder 43 and abuts spring 40. The threaded end of pin 42 extends through the hole in the closed end of cylinder 43. The threaded aperture of knob 41 engages the threaded end of pin 42. The threaded end of cylinder 43 is screwed into the horizontal threaded hole in the removable half of block 18 such that the portion of pin 42 that extends beyond the collar protrudes through the centrally located aperture in the closed end of the horizontal hole.

The lid 11 has a front wall 26, two sides walls 27, and a back wall 28 that are joined together to form a peripheral wall 29. The peripheral wall 29 is fastened to the top 30 of the lid. The length and width of the peripheral wall 29 is equivalent to the length and width of the peripheral wall 17 of the box shaped base 16. The bottom of the peripheral wall 29 has a groove 38 formed to the interior surface which is designed to interlock with the groove 20 on the peripheral wall 17 when the lid 11 is closed. Attached to the exterior surface of one side wall 27 and the corresponding exterior surface of the side wall 13 of the box shaped base are two hinges 31 to allow the lid to be opened and closed. Attached to the exterior surface of the other side wall 27 is the top portion of a latch 32. The bottom portion of the latch 32 is attached to the corresponding exterior surface of the side wall 13 of the box shaped base. The function of the latch 32 is to hold the lid in the closed position to prevent spillage of the school supplies.

The attachment blocks 18, support wall 53, triangular shaped block 21, and support blocks 9 can be formed as integral parts of the box shaped base 16. The box shaped base 16, attachment blocks 18, support wall 53, spacers 25, triangular shaped block 21, support blocks 9, and lid 11 can be made of a translucent or opaque plastic material; this choice of material would allow various colors and/or designs to be imparted to the plastic material before, during, or after formation of the box shaped base, attachment blocks, support wall, spacers, triangular shaped block, support blocks, and lid. It can also be understood that the box shaped base 16, attachment blocks 18, support wall 53, spacers 25, triangular shaped block 21, support blocks 9, and lid 11 could be made of a transparent plastic material allowing the contents to be visible through the transparent material. It can further be understood that the hollow cylinder 43, pin 42, and cylindrical knob 41 can be made of the same plastic material as the box shaped base. The spring 40 can be made of a metallic material. The axle 22 can be made of a solid metallic material and the wheels 23 can be made of a solid plastic material with or without a fixed rubber tire. It can readily be seen that the box shaped base 16 could also comprise a frame made of a plastic material that incorporates the attachment blocks 18, support wall 53, triangular shaped block 21 and support blocks 9 and has a flexible material such as canvas attached to the exterior of the frame. In this configuration, the lid 11 can be made of the same flexible material and can be held in the closed position by a zipper.

Figure 5:
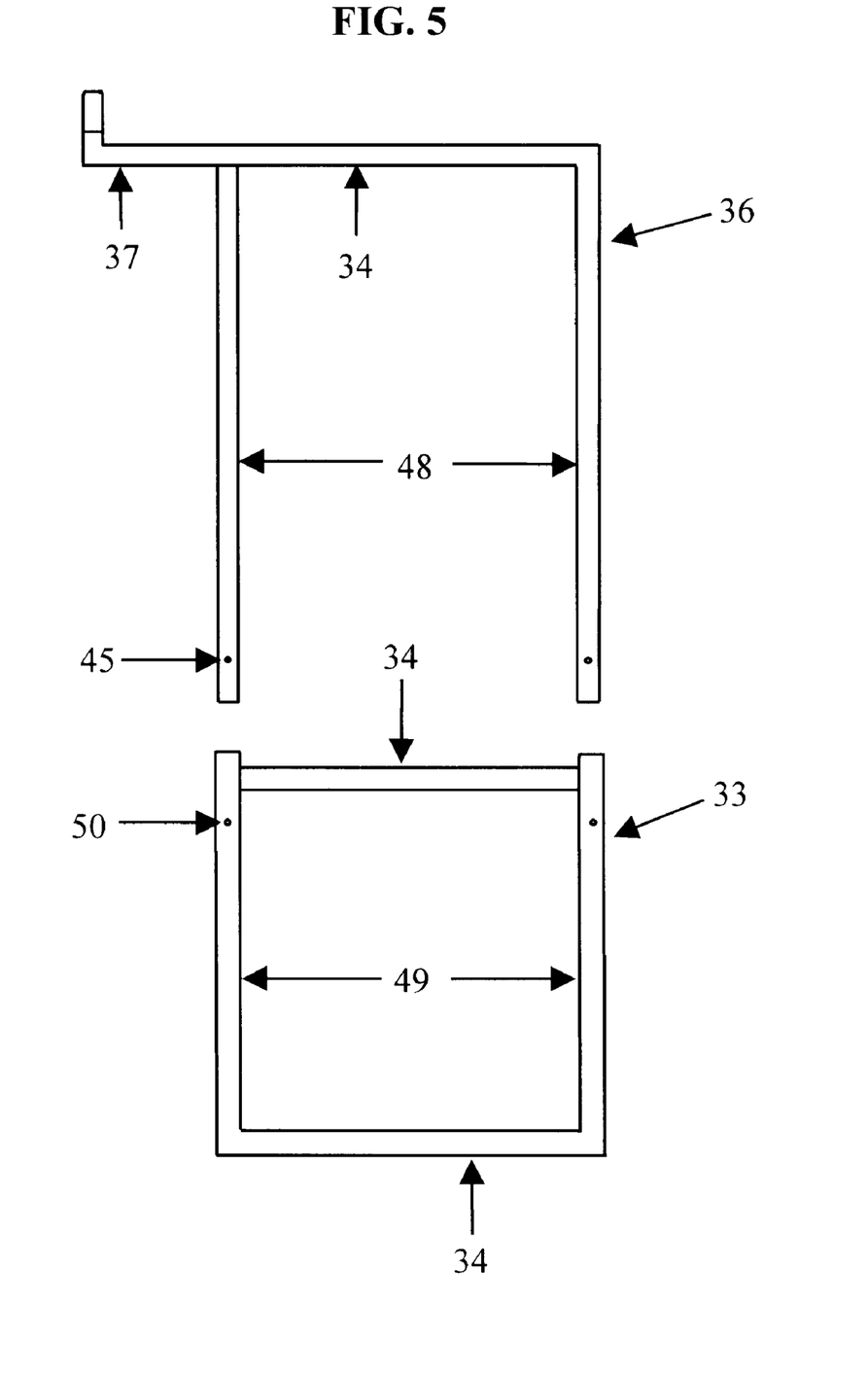
FIG. 5 is a back perspective view of the upper and lower portions of the telescoping handle assembly.

The telescoping handle assembly 10 comprises a bottom section 33 with two hollow tubes 49 closed at one end by a hollow crossbar 34 and having a second hollow crossbar 34 fixed to the open ends of the hollow tubes 49 and a top section 36 with two hollow tubes 48 closed at one end by a hollow crossbar 34 and having an offset handle extension 37 attached to one end of the hollow crossbar 34. The offset handle extension 37 being closed by a flexible gripping device 44. In close proximity to the open ends of the hollow tubes 49 of the bottom section 33 are two holes 50 such that pins 42 of the spring loaded locking devices 35 extend through the holes 50 and protrude into the hollow tubes 49. Near the open ends of the hollow tubes 48 of the top section 36 are two holes 45. In the extended position, the pins 42 of the spring loaded locking devices 35 engage the holes 45 in the top section to prevent the top section from retracting. In the retracted position, the length of the telescoping handle assembly 10 is less than the distance from the floor to the bottom of a school desk thereby allowing the transporting device to be stowed under the desk when not in use. The offset handle extension 37, allows the transporting device to be towed behind the student. It can be seen that the telescoping handle assembly and offset handle extension can be made of a metallic or plastic material. It can also be seen that the gripping device 44 can be made of a flexible plastic material.

Figure 1:
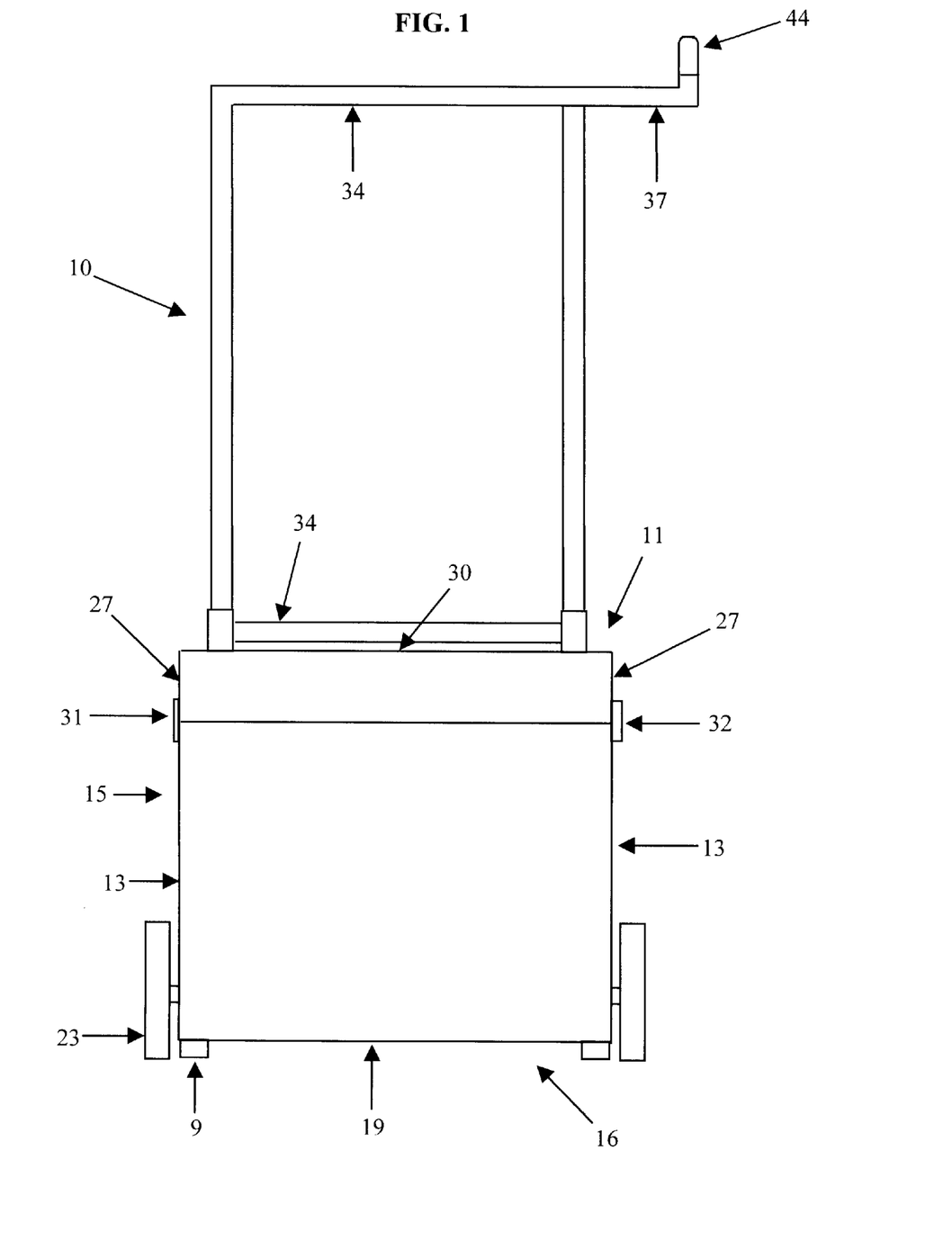
FIG. 1 is a front perspective view of the instant invention.
Figure 2:
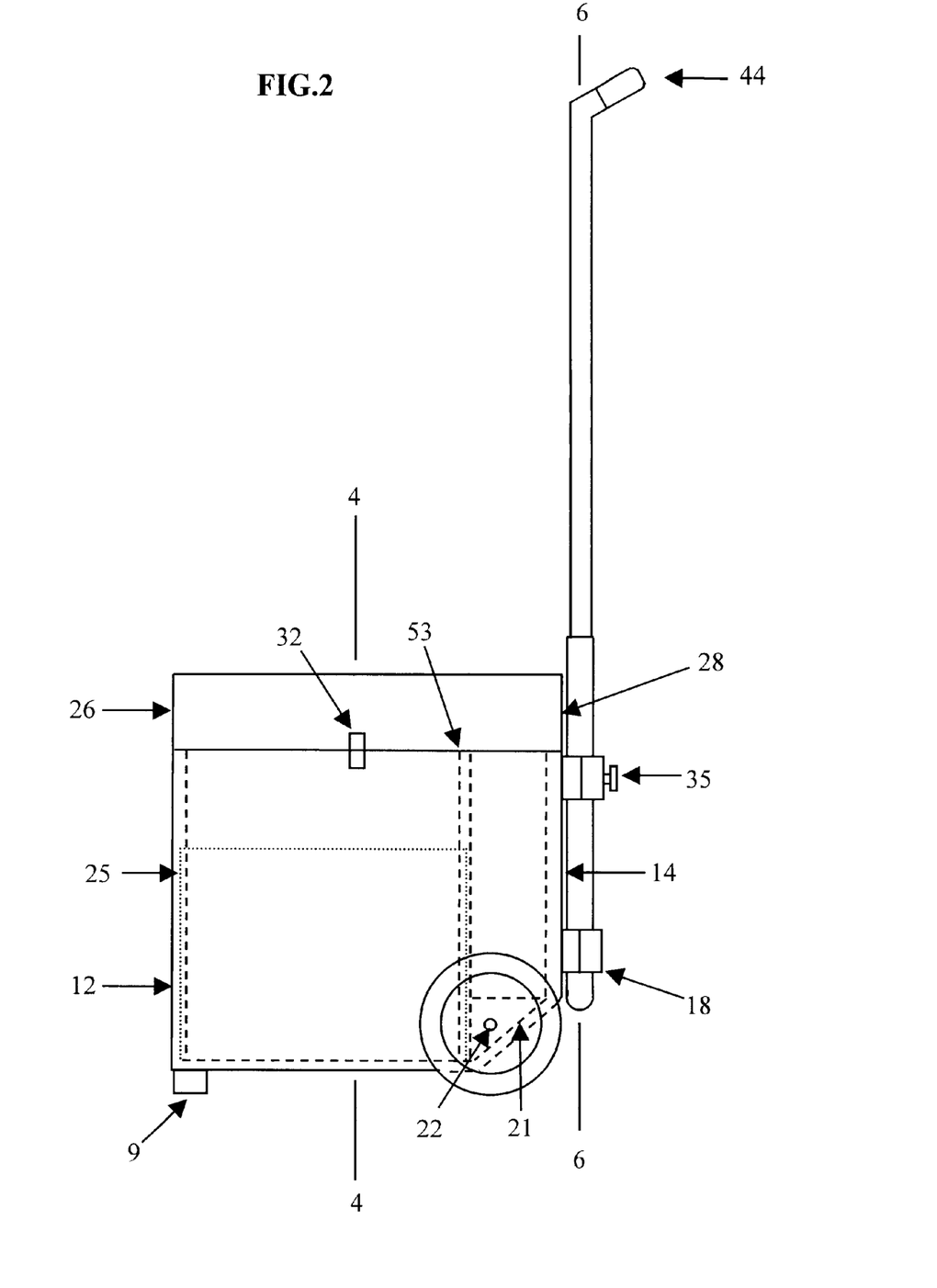
FIG. 2 is a side perspective view of the instant invention.
Figure 3:
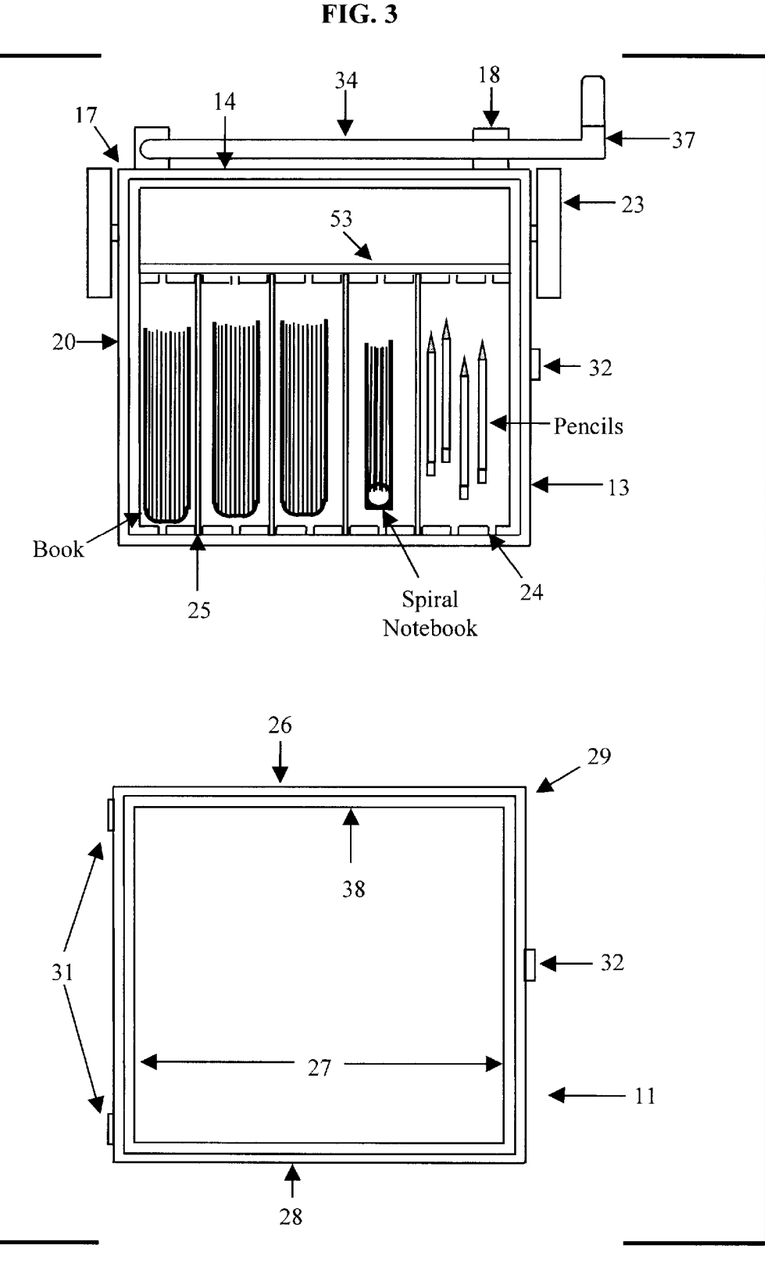
FIG. 3 is a top perspective view of the instant invention with the lid removed to illustrate the possible placement of school supplies within the container.
Figure 4:
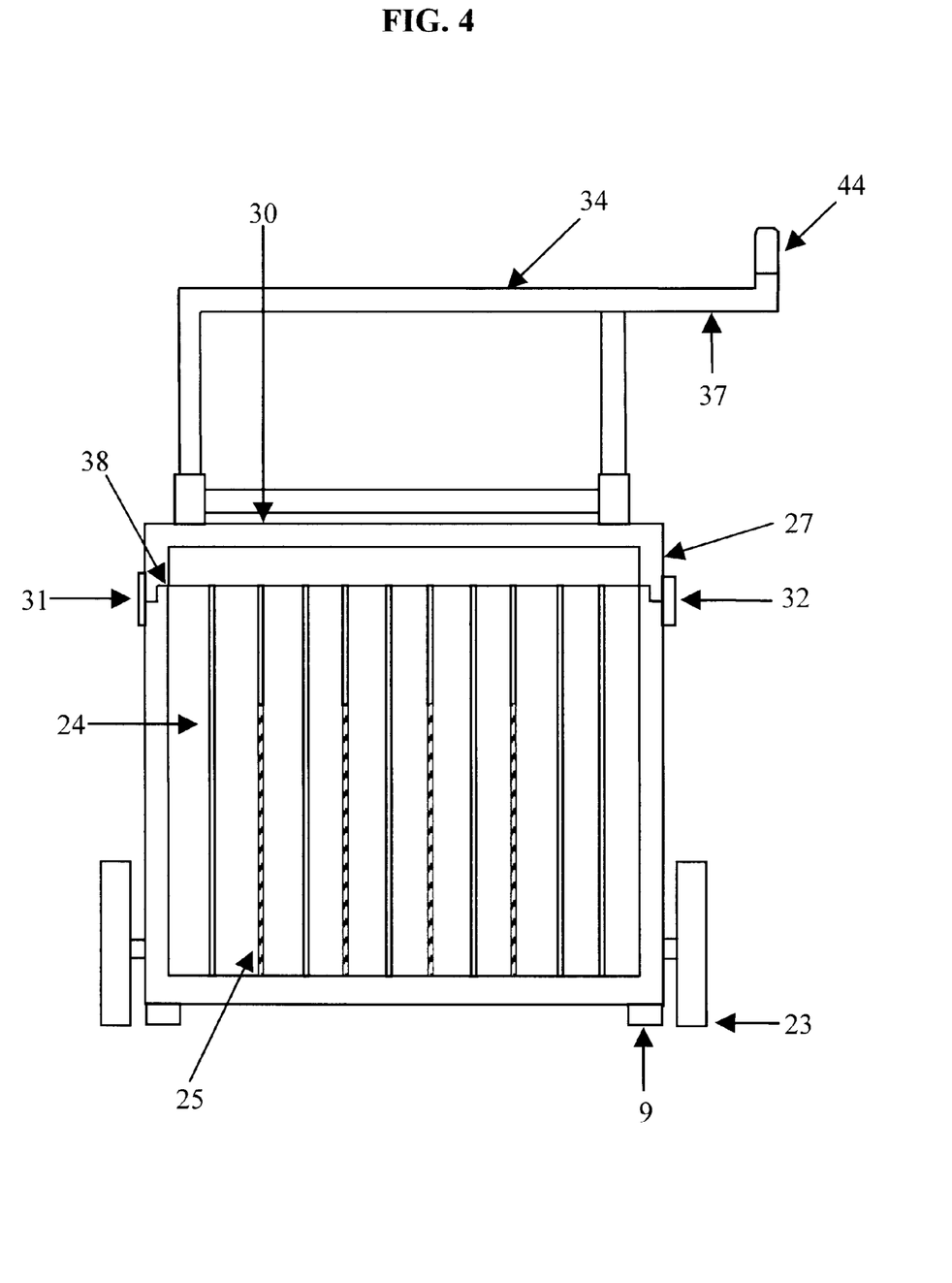
FIG. 4 is a front sectional view of the instant invention taken substantially along the line of 4—4 and showing the handle in the retracted position.

Having thus described the structure of the transporting device, it can be understood that a student can utilize the device by extending the telescoping handle and grasping the offset extension and manually towing the transporting device. As can be seen in FIG. 3, school supplies can be placed in the storage compartment 15. Having been disclosed in use to transport school supplies, it can readily be seen that the transporting device could be used by students, teachers, or anyone who is required to transport cumbersome or difficult to carry articles.

The foregoing is considered as illustrative only of the principles of the invention. Further, since numerous modifications and changes will readily occur to those skilled in the art, it is not desired to limit the invention to the exact construction, materials, and operation shown and described, and accordingly, all suitable modifications and equivalents may be resorted to, falling within the scope of the invention as claimed.

I claim:

1. A transporting device comprising a storage means with incorporated axle and attached wheels and towing means, said storage means embodying a hollow container having a hinged closure, said hollow container comprising a rectangular box closed at one end and open at the other end, said box having two side walls and a front wall and a back wall joined to form a peripheral wall, said peripheral wall being fixed to said closed end, said peripheral wall having a groove formed on the exterior surface thereof at said open end, said hinged closure comprising a rectangular lid closed at one end and open at the other end, said rectangular lid having a front wall and two side walls and a back wall joined to form a peripheral wall, said peripheral wall being fixed to said closed end, said peripheral wall having a groove formed on the interior surface thereof at said open end, two support blocks being fixed to the bottom surface of said closed end, said support blocks being located along the edge formed by the juncture of said front wall and said closed end of said box and being adjacent to said side walls, said box having a beveled edge formed at the juncture of said closed end and said back wall, said box having a support wall disposed therein and perpendicularly fixed to said side walls and said closed bottom, said front wall having vertical grooves formed on the interior surface thereof, said support wall having vertical grooves formed on the interior surface thereof, said vertical grooves of said front wall and said support wall being in alignment such that a removable rectangular spacer being slidingly inserted into an aligned pair of said grooves is held in a vertical position perpendicular to said front wall and said support wall and to said closed bottom, said box having a triangular block therein fixed to said beveled edge and said side walls, said block having a centrally located cylindrical hole in alignment with and communicating with the interior of a corresponding hole in each of said side walls, an axle and two wheels, said axle extending through said hole in one of said side walls, said block, and the other side wall of said box, said wheels attached to each end of said axle, the exterior surface of said back wall having four rectangular blocks fixed thereto such that two of said blocks are aligned with said side walls and said top and two of said blocks are aligned with said side walls and said bottom, the bottom two of said blocks being in vertical alignment with the upper two of said blocks, all four said blocks having a centrally located vertical hole, all four said blocks being cut into two equal halves along a vertical plane parallel to said back wall such that one half of said blocks are permanently fixed to said back wall, the other half of said blocks are removably attachable to said fixed halves, said equal halves being joined by screws to secure said towing means to said box, said removable halves having an internally threaded horizontal cylindrical hole for incorporation of a spring loaded locking device, said hole being open at one end and closed at the end normally joining said fixed halves, said closed end having a centrally located hole. said spring loaded locking device comprises a spring, a cylindrical knob having a centrally located threaded aperture, a cylindrical pin having external threads formed at one end and having a collar fixed in close proximity to the other end such that a portion of said pin extends beyond said collar, a hollow cylinder flanged at one end and being externally threaded, said cylinder being closed at said flanged end, said closed end having a centrally located hole, said spring being slidingly inserted into said hollow cylinder such that one end of said spring abuts said closed end, said threaded end of said pin being slidingly inserted into said spring and said cylinder such that said threaded end extends through said hole in said closed end and said collar abuts said spring, said threaded end engaging said threaded aperture in said knob.

2. The device of claim 1 wherein said towing means comprises a telescoping handle having an upper portion open at one end and closed at the other end, said closed end having an offset extension fixed thereto, a lower portion open at one end and closed at the other end and having a support crossbar fixed to said open end, said upper portion comprises two hollow tubes being closed at one end by a hollow crossbar and being open at the other end, said hollow tubes having a hole located in close proximity to said open end, said offset extension being fixed to one end of said hollow crossbar, said lower portion comprises two hollow tubes being closed at one end by a hollow crossbar and being open at the other end, said open end having a hollow support crossbar fixed thereto, said hollow tubes having a hole located between said closed end and said hollow crossbar and in close proximity to said hollow crossbar, said open end of said upper portion being slidingly inserted into said open end of said lower portion, said holes in said upper portion and said lower portion being in alignment with and engaging a pin in said spring loaded locking devices when said telescoping handle is extended.

3. The device of claim 2 wherein said offset extension comprises a hollow tube being centrally bent to form a right angle, said hollow tube being normally closed at the free end by a hollow flexible gripping tube, said gripping tube being closed at one end, the free end of said gripping tube being slidingly pushed onto the free end of said offset extension.

4. A transporting device comprising, in combination, a hollow portable article storing and transporting container open at its top and closed at its bottom and incorporating an axle with attached wheels, a removably attachable two piece telescoping handle having an offset handle extension fixed thereto, said container having a front wall and two side walls and a back wall joined to form a peripheral wall, said peripheral wall being fixed at one end to said closed bottom, the bottom surface of said closed bottom having two supports fixed thereto, said supports being in alignment with the bottom edge of said front wall and adjacent to said side walls, said container having a groove formed on the exterior surface of said peripheral wall at said open end, a manually opening and closing hinged lid normally closing said open top, said lid being closed at its top and open at its bottom, said lid having a front wall and two side walls and a back wall joined to form a peripheral wall, said peripheral wall being fixed at one end to said closed top, said lid having a groove formed on the interior surface of said peripheral wall at said open bottom, said groove of said lid interlocks with said groove of said container when said lid is closed, said container having a beveled edge formed at the junction of said back wall and said closed bottom, said container having an interior support wall fixed perpendicularly to said side walls and said closed bottom, the interior surface of said front wall and said support wall having vertical grooves formed thereon and in alignment such that a removable insertable rectangular spacer being slidingly inserted into said grooves forms a vertical partition perpendicular to said front wall and said support wall and said closed bottom, said container having a triangular block disposed therein and fixed to said beveled edge and said side walls, said block having a centrally located cylindrical hole extending through the length of said block and being in alignment and communicating with the interior of a corresponding hole in each of said side walls, said axle being slidingly inserted through the hole in one of said side walls, the triangular block, and the other side wall of said box such that the ends of said axle extend beyond said side walls, said wheels being attached to each end of said axle, a two piece latch, the lower portion of said latch being attached to one of said side walls of said container at a point centrally located on a plane adjacent to said open top, the top portion of said latch being attached to the corresponding side wall of said lid and being in alignment with and engaging said bottom portion of said latch, said lid being attached by hinges to said side wall opposite said latch, the exterior surface of said back wall of said container having four centrally apertured rectangular blocks fixed thereto, said aperture extending vertically through said blocks, said blocks being cut into two equal parts along a vertical plane parallel to said back wall, said equal parts being normally joined by screws to secure said telescoping handle to said back wall, the upper two said blocks being in alignment with said sides and said open top and incorporating spring loaded locking devices, the lower two said blocks being in alignment with said sides and said bottom and being in vertical alignment with the upper two said blocks, said spring loaded locking devices comprise a centrally apertured cylindrical knob, a spring, a hollow externally threaded cylinder being closed at one end and open at the other end, said closed end being flanged and having a centrally located hole, a cylindrical pin having a collar attached near one end and being adapted at the opposite end to engage said aperture in said knob, said spring being slidingly inserted into and enclosed by said cylinder, the adapted end of said pin being slidingly inserted into said enclosed spring such that said collar is enclosed by said cylinder and abuts said spring, said adapted end of said pin extending through said hole in said closed end and engaging said aperture of said knob.

5. The device of claim 4 wherein said telescoping handle comprises an upper portion with a fixed offset extension and a lower portion, said upper portion comprises two hollow tubes closed at one end by a hollow crossbar and open at the other end, said hollow tubes having a hole located near said open end, said offset extension being fixed to one end of said hollow crossbar, said lower portion comprises two hollow tubes closed at a one end by a hollow crossbar and fixed to a hollow support crossbar in close proximity to said open end, said hollow tubes having a hole located between said support crossbar and said closed end at a point adjacent to said support crossbar, the free end of said upper portion being slidingly inserted into the free end of said lower portion.

6. The device of claim 5 wherein said offset extension comprises a closure and a hollow tube, said hollow tube being bent to form a right angle at a point equally distant from its ends, said offset extension being normally closed at the free end by said closure, said closure comprises a hollow flexible tube closed at one end, the free end of said closure being slidingly pushed onto the free end of said offset extension.

7. The device of claim 5 wherein said container and said lid are made of a translucent material.

* * * * *